United States Patent [19]
Bernacki

[11] Patent Number: 6,137,632
[45] Date of Patent: Oct. 24, 2000

[54] METHOD AND APPARATUS FOR LOSSLESS BEAM SHAPING TO OBTAIN HIGH-CONTRAST IMAGING IN PHOTON TUNNELING METHODS

[75] Inventor: Bruce Edward Bernacki, Layton, Utah

[73] Assignee: Iomega Corporation, Roy, Utah

[21] Appl. No.: 09/294,839

[22] Filed: Apr. 19, 1999

[51] Int. Cl.[7] .............................. G02B 27/10; G02B 3/00; G02B 3/02; G02B 3/06
[52] U.S. Cl. ........................ 359/618; 359/642; 359/708; 359/709; 359/710
[58] Field of Search .................................. 359/708–719, 359/618, 642

[56] References Cited

U.S. PATENT DOCUMENTS 5,583,342 12/1996 Ichie ...................................... 250/459.1

Primary Examiner—Georgia Epps
Assistant Examiner—Michael A Lucas
Attorney, Agent, or Firm—Woodcock Washburn Kurtz Mackiewicz & Norris LLP

[57] ABSTRACT

An axiconic telescope that receives a collimated input light beams and includes a first axicon and second axicon. Depending on the distance between the two axicons, the input collimated beam is converted to a diverging conical wave front by the first axicon, which is re-collimated by the second axicon having an oppositely signed cone angle. The output of the telescope is a collimated beam having an annular cross section, with the annulus having a width of dependent on the diameter of the telescope. The axiconic telescope may be used to produce an output beam having annulus size that can be optimized to illuminate a portion of a transducer in an solid immersion lens or photon tunning method device that contributes evanescent waves to increase resolution of an optical device.

18 Claims, 3 Drawing Sheets

METHOD AND APPARATUS FOR LOSSLESS BEAM SHAPING TO OBTAIN HIGH-CONTRAST IMAGING IN PHOTON TUNNELING METHODS

FIELD OF THE INVENTION

The present invention relates to optical imaging, and more particularly, relates to a method and apparatus for high-resolution imaging.

DESCRIPTION OF THE PRIOR ART

Optical data storage systems are of great interest because of their potential for very high data density. Unlike magnetic recording where data density may be limited by particle size, the density of optical recording is limited by the diffraction limit of the illuminating light. In practice, the data density is in part also limited by how small illuminating radiation, such as a laser beam, can be focused to on the disk.

To reduce the laser spot diameter in high-resolution imaging systems, several methods have been employed, such as increasing the frequency of light used read the storage media, and increasing the numerical aperture of the lens. With regard to the former, systems utilizing higher frequencies of light to reduce laser spot diameter are costly and large. With regard to the latter, two frequently implemented methods are used to decrease spot size: Photo Tunneling Microscopy (PTM) and Solid Immersion Lens (SIL).

These latter methods rely on the production of evanescent waves tunneling from a transducer to the object under examination (e.g., an optical disk). The evanescent waves are produced by an optical transducer in which light rays traveling from a more dense medium to a less dense medium are arranged to refract at the interface between these two regions at greater than the critical angle. The critical angle is defined by relationship (1):

$$\theta_{crit} = \sin^{-1}\left(\frac{n_2}{n_1}\right)$$

where $n_1$ and $n_2$ are the more dense and less dense media, respectively. The enhanced resolution is obtained from the so-called tunneling of photons into the object having a new index $n_3 > n_2$. These tunneling photons produced by evanescent waves have the reduced wavelength $\lambda/n_1$, where $\lambda$ is the free-space wavelength and $n_1$ is the index of the more dense transducer medium.

The evanescent field decays exponentially with tunneling distance z, and is obtained by relationship (2):

$$E_{evanescent} = E_0 \exp\left(\frac{-z}{d_p}\right)$$

where $E_0$ is the incident radiation in a medium, and $d_p$ is the penetration depth at which the incident radiation reaches its 1/e value. The penetration depth may also be expressed by relationship (3):

$$d_p = \frac{\frac{\lambda}{n_1}}{2\pi\sqrt{\sin^2\theta - \left(\frac{n_2}{n_1}\right)^2}}$$

where $\lambda$ is the free space wavelength of the light, and $n_2$ and $n_1$ are the indices of refraction in the less dense medium and more dense medium, respectively.

FIG. 1 illustrates a plot of the penetration depth as a function of incident angle for glass ($n_1$=1.5) adjacent to an air ($n_2$=1) boundary. Note that for angles below the critical angle (41.8°), no evanescent wave is produced. Thus, no super resolving wave having a shortened wavelength is produced below these angles.

While the full N.A. (numeric aperture) of the objective is used to image the transducer-sample interface, only total internal reflection (TIR) illumination (N.A. 1–1.25) contributes to the tunneling image. With the photon tunneling approach to super resolution (e.g., PTM and SIL), rays incident on the transducer interface at less than the critical angle do not contribute to the enhanced resolution image. Such rays add background noise and reduce image contrast. Typically, these rays are removed by centrally obscuring the illumination aperture to improve the image. Unfortunately, this amplitude masking method requires greater illumination levels to achieve a given image intensity level as measured at the image surface since some of the illumination light is thrown away to remove the offending, non-evanescent (and therefore non-super-resolution) rays.

It is known to mask rays that do not contribute to the TIR condition, as these non-evanescent waves, have been found to enhance the contrast and resolution of the image. The blocking of the non-TIR rays is essentially a spatial filtering that blocks out those components of the image with lower spatial frequencies. The present invention provides for an improved method of achieving higher contrast imaging by tailoring the input illumination such that only those rays that contribute to evanescent and hence super resolving rays propagate through the lens preceding the photon tunneling transducer or solid immersion lens (SIL) without resorting to an obscuration.

SUMMARY OF THE INVENTION

In view of the above, the present invention, through one or more of its various aspects and/or embodiments is thus presented to accomplish advantages over the prior art, such as those noted below.

In accordance with the present invention, an apparatus and method are provided for lossless beamshaping. The apparatus includes a first and second axicon aligned to receive an input light beam. The input beam is passed through the first and second axicon to form an output beam having an annular cross section. The output beam may be made incident upon a focusing element, which in turn focuses the light onto a transducer. The transducer may be, for example, a solid immersion lens. The apparatus provides higher contrast imaging by tailoring the input illumination such that only those rays that contribute to evanescent and hence super resolving rays propagate through the lens preceding the photon tunneling transducer or solid immersion lens (SIL) without resorting to an obscuration.

The foregoing and features and advantages of the invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

The present invention is directed to beam shaping of the input beam to present only those rays having angles of incidence equal to or greater than the angle of total internal reflection to either a solid immersion lens (SIL) or photon tunneling transducer (PTM). The present invention may be accomplished by arranging two or more refractive, reflective, or diffractive axicon optical elements to form aconical Galilean-type telescope. The axicon-type telescope maps a collimated disk of light with diameter 2a into an annulus of width a with high efficiency (neglecting Fresnel losses at each refracting/reflecting surface). This annulus of light is in turn used to illuminate only that portion of the evanescent wave-producing apparatus that contributes waves due to frustrated total internal reflection (TIR) as opposed to an amplitude mask that throws away some of the incident light. This approach can also be used to effect a centrally obscured pupil of a conventional imaging system. A centrally obscured pupil also has super-resolution properties by reshaping the spatial frequency response of the imaging system to narrow the central lobe of the point spread function.

Figure 1:
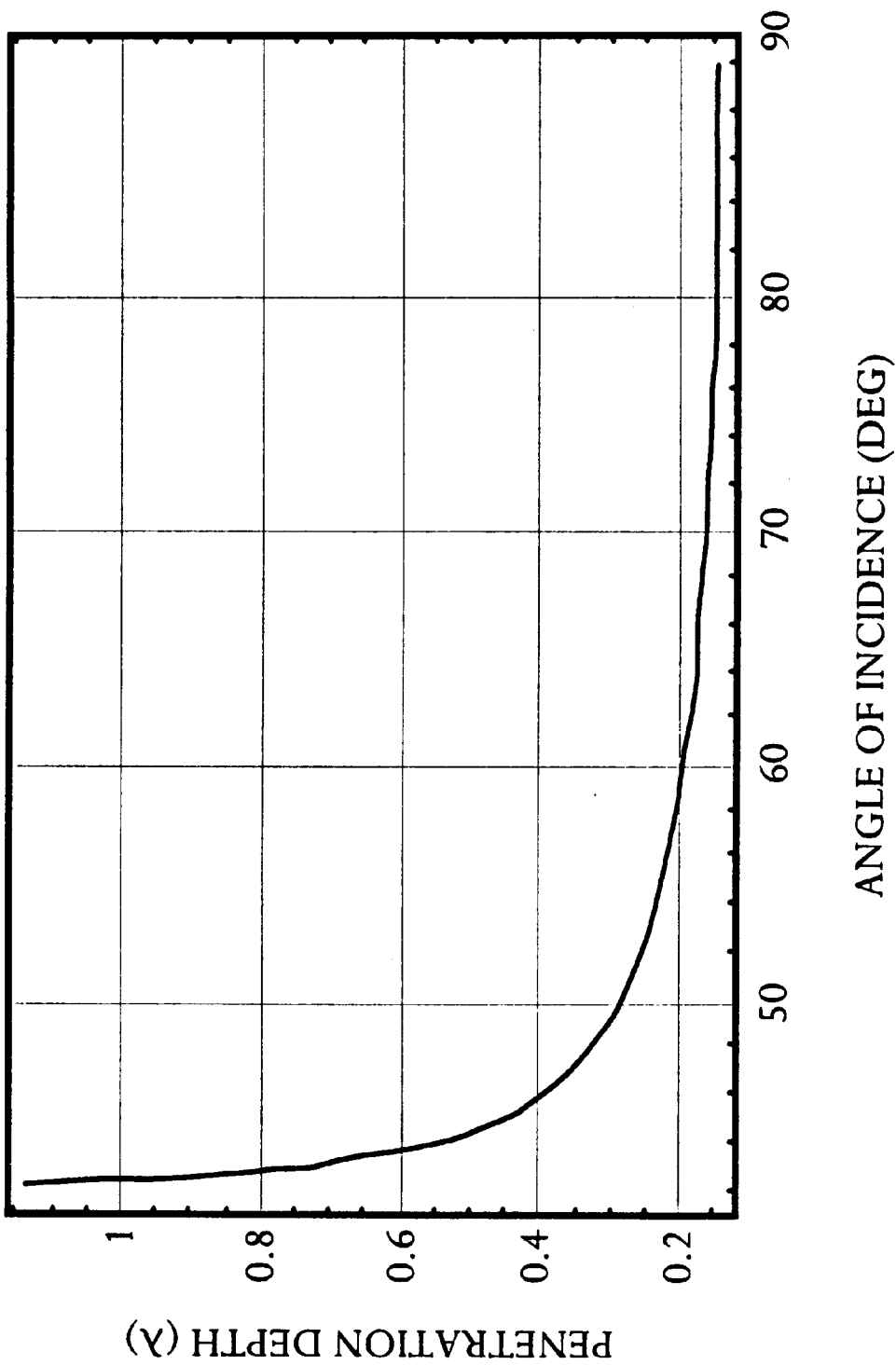
FIG. 1 illustrates a graph of penetration depth (in units of wavelengths) versus angle of incidence beyond the critical angle.
Figure 2:
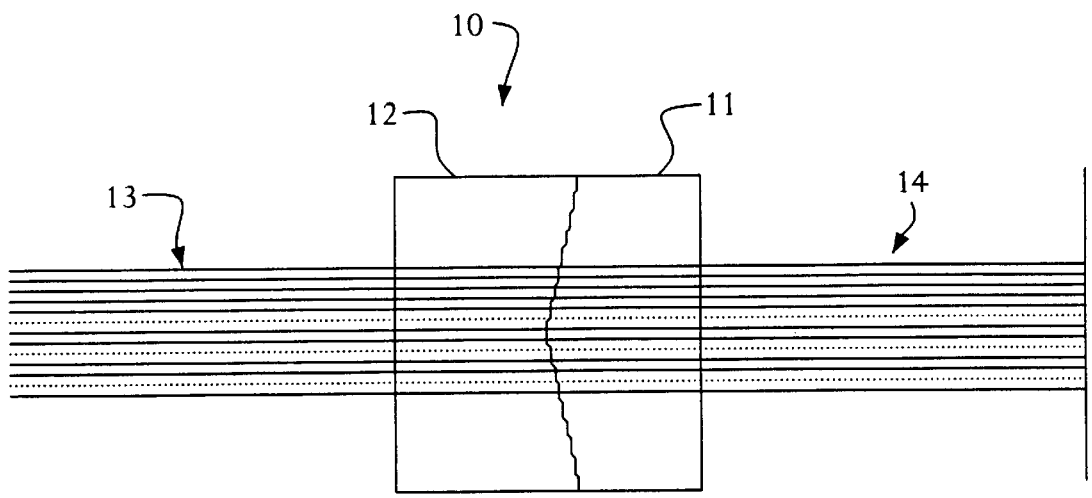
FIG. 2 illustrates a axiconic telescope having a positive and negative refractive axicons in contact.

Referring now to FIG. 2, there is illustrated positive and negative refractive axicons 11 and 12, respectively, in contact. As shown, the output light waves 14 are collimated and unchanged from the input light waves 13. The axicon is a rotationally symmetric conical element that maps a point into a line, for finite conjugates, or a plane wave into a converging or diverging annulus, at infinite conjugates. Two axicons, one negative 12 (diverging conical wave front) and the second positive 11 (converging conical wave front) can be arranged to form an axicon telescope 10, which is an analog to a Galilean telescope. The Galilean telescope is well-known in spherical optics and is typically employed as a beam expander in the optical laboratory. The Galilean telescope transforms a collimated input beam into an output beam having a minimized or magnified diameter depending on the focal length of the two elements, separation distance of the two telescope elements, and the telescope orientation.

Figure 3:
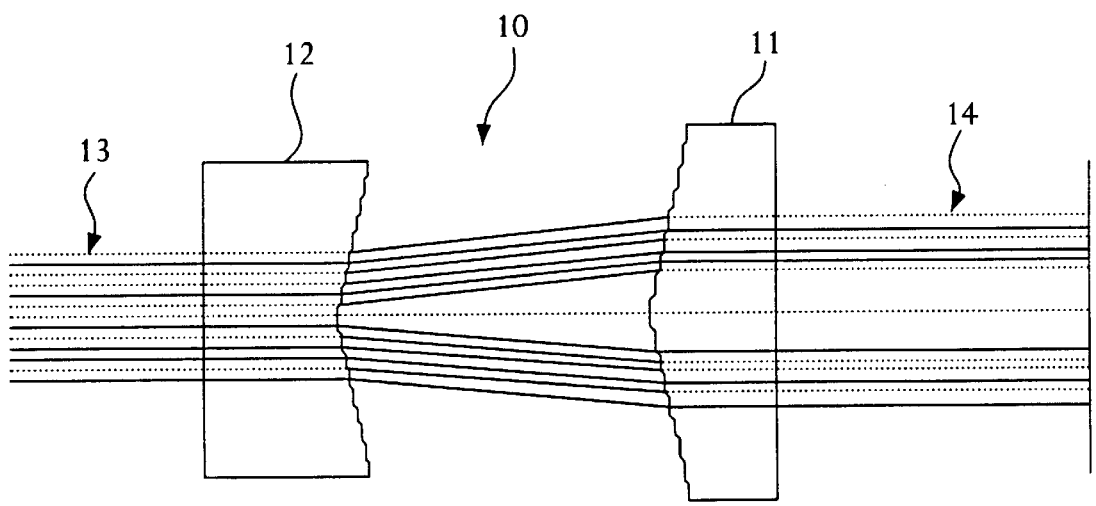
FIG. 3 illustrates a axiconic telescope having a positive and negative refractive axicons in separated such that an output having an annular cross-section is produced.

Referring now to FIG. 3, there is illustrated the positive and negative refractive axicons 11 and 12 separated from each other in the axicon telescope 10. The output 14 is still collimated, but now has an annular cross section. In the axicon telescope 10, the planar input wave front 13 is also mapped into a planar output wave front 14 having a magnified (or minimized) diameter, but the output beam will also have an annular cross-section. The correct choice of annulus size can be optimized to illuminate only that portion of the transducer that contributes evanescent wave. The means for achieving the above is shown in FIG. 2 and FIG. 3.

When a positive and negative axicon 11 and 12 having equal (but oppositely signed) apex angles are placed in contact, the optical effect on a collimated beam is equivalent to a plane parallel plate of glass, i.e., the beam is undeviated and unaltered. When the two elements 11 and 12 are separated, as in FIG. 3 the input collimated beam is converted to a diverging conical wave front, which is re-collimated by a positive axicon 11 having the oppositely signed cone angle. Note that for a uniform collimated beam at the input to the axicon telescope having diameter 2a, the output of the telescope is also collimated having an annular cross section, with the annulus having a width of a. For small cone angles (a<10°), the magnification from the input beam to the output beam can be expressed by relationship (4):

$$M \cong 1 + 2\frac{d \cdot \alpha}{2a}\left(\frac{n-1}{1-\alpha}\right)$$

where a is the input aperture radius, $\alpha$ is the axicon cone angle, d is the separation distance of the two elements, and n is the index of refraction of the elements.

Figure 4:
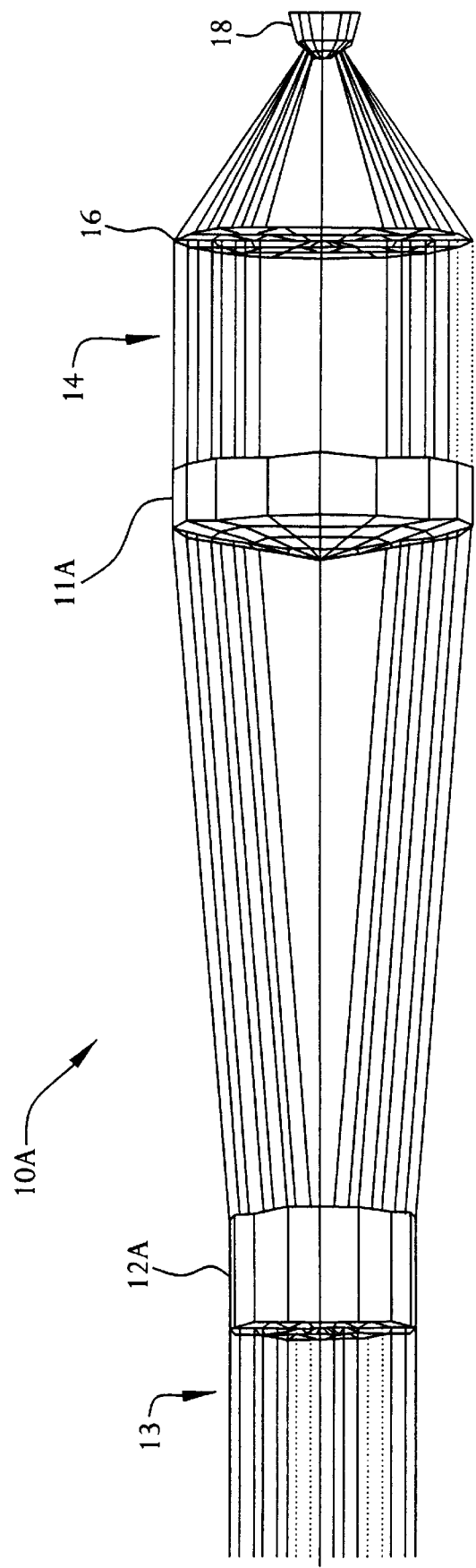
FIG. 4 illustrates a solid model of an axicon telescope used to shape an input beam into an annular ring output that illuminates an idealized focusing objective.

Referring now to FIG. 4, there is illustrated a solid model of axicon telescope 10A used to shape the input beam 13 into an annular ring output 14 that illuminates an idealized focusing objective 16. The annular ring permits only those rays with angles of incidence greater than the critical angle to be focused by the focusing objective 16 onto the photon tunneling transducer 18. Such an arrangement creates evanescent waves capable of super resolution. Further, such an arrangement effects a modification of the modulation transfer function of the focusing objective 16 to achieve enhanced resolution without the illumination loss present in the prior art. In this example, the transducer 18 is a SIL hemisphere, however, other similar transducers may be used. The transducer 18 is adapted to be optically coupled to a data storage medium.

The design of the axicon telescope 10A (element diameters, material index, and cone angles) and the separation of the two elements can be specified in accordance with relationship (4) so that only that portion of the evanescent wave-producing transducer (solid immersion lens, oil-immersion microscope objective and cover slip, etc.) is illuminated. Thus, the photon tunneling device uses all of the available illumination energy, thereby increasing the imaging efficiency but more importantly increases image contrast by eliminating specularly-reflected light from the base of the evanescent wave transducer that does not contribute to super resolution imaging but is essentially a noise term. In addition, a more compact system can be made by combining the focusing element with the axicon element at the output end of the beam shaping telescope.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed:

1. A device for lossless shaping of an input beam to an imaging system, comprising:

a first axicon;

a second axicon separated from said first axicon by a distance;

a focusing element; and a transducer, wherein said input beam is passed through said first axicon and said second axicon to form an output beam having an annular cross section, and wherein said output beam is incident upon said focusing element and focused onto said transducer.

2. The device as recite in claim 1, wherein said first axicon and said second axicon comprise at least one of a refractive, reflective and diffractive optical surface.

3. The device as recited in claim 1, wherein a width of said annular cross section is altered by altering said distance, wherein a distribution of rays that enter said focusing element is changed in accordance with said width of used in either a photon tunneling or apodization application, by translating one axicon element with respect to the second.

4. The device as recited in claim 1, wherein said first axicon and said second axicon are arranged in a telescopic configuration, wherein said input beam has a disk-like cross section, and wherein said transducer consists of a solid immersion lens (SIL) or a combination of an oil immersion objective and flexible transducer.

5. The device as recited in claim 1, wherein said first axicon and said second axicon shift said input beam from a disk-like cross section for input to said focusing element to effect an apodized aperture, whereby a modification of the modulation transfer function of said focusing element achieves enhanced resolution without the illumination loss.

6. The device as recited in claim 1, wherein said device converts a collimated disk of light with diameter 2$a$ into an annulus of width a.

7. The device as recited in claim 1, wherein an input aperture to said first axicon and said second axicon has a first diameter, and wherein said annular cross section has a second diameter related to said first diameter.

8. The device as recited in claim 7, wherein rays of said input beam that do not contribute to total internal reflection are not passed to said transducer.

9. The device as recited in claim 1, further comprising a second transducer having a positive refractive axicon, and wherein said first axicon comprises a negative refractive axicon.

10. In a device including a first axicon, a second axicon separated from said first axicon by a distance, a transducer adapted to be optically coupled to a data storage medium, and a focusing element, said device receiving an input beam, a method of lossless beamshaping comprising:

passing said input beam through said first axicon and second axicon to create an output beam having an annular cross section; and directing said output beam onto said focusing element, wherein said step of passing said input beam comprises excluding rays that do not contribute to total internal reflection.

11. The method as recited in claim 10, said device further comprising a transducer that is adapted to be optically coupled to a data storage medium, and said method further comprising:

directing said output beam onto said transducer such that frustrated TIR is coupled into said data storage medium to increase storage density.

12. A device for lossless shaping of a collimated input beam to an imaging system, comprising:

a negative refractive axicon;

a positive refractive axicon separated from said negative axicon by a distance;

a focusing element; and a transducer, wherein said collimated input beam is passed through said negative axicon and said positive axicon to form a collimated output beam having an annular cross section, and wherein said collimated output beam is incident upon said focusing element and focused onto said transducer.

13. The device as recited in claim 12, wherein a width of said annular cross section is altered by altering said distance, wherein a distribution of rays that enter said focusing element is changed in accordance with said width of used in either a photon tunneling or apodization application, by translating one axicon element with respect to the second.

14. The device as recited in claim 13, wherein said first axicon and said second axicon are arranged in a telescopic configuration, and wherein said input beam has a disk-like cross section.

15. The device as recited in claim 12, wherein said negative axicon and said positive axicon shift said collimated input beam from a disk-like cross section for input to said focusing element to effect an apodized aperture, whereby a modification of the modulation transfer function of said focusing element achieves enhanced resolution without the illumination loss.

16. The device as recited in claim 12, wherein an input aperture to said negative axicon and said positive axicon has a first diameter, and wherein said annular cross section has a second diameter related to said first diameter.

17. The device as recited in claim 16, wherein rays of said collimated input beam that do not contribute to total internal reflection are not passed to said transducer.

18. The device as recited in claim 12, wherein said transducer consists of a solid immersion lens or a combination of an oil immersion objective and flexible transducer.

* * * * *